No. 773,637. Patented November 1, 1904.

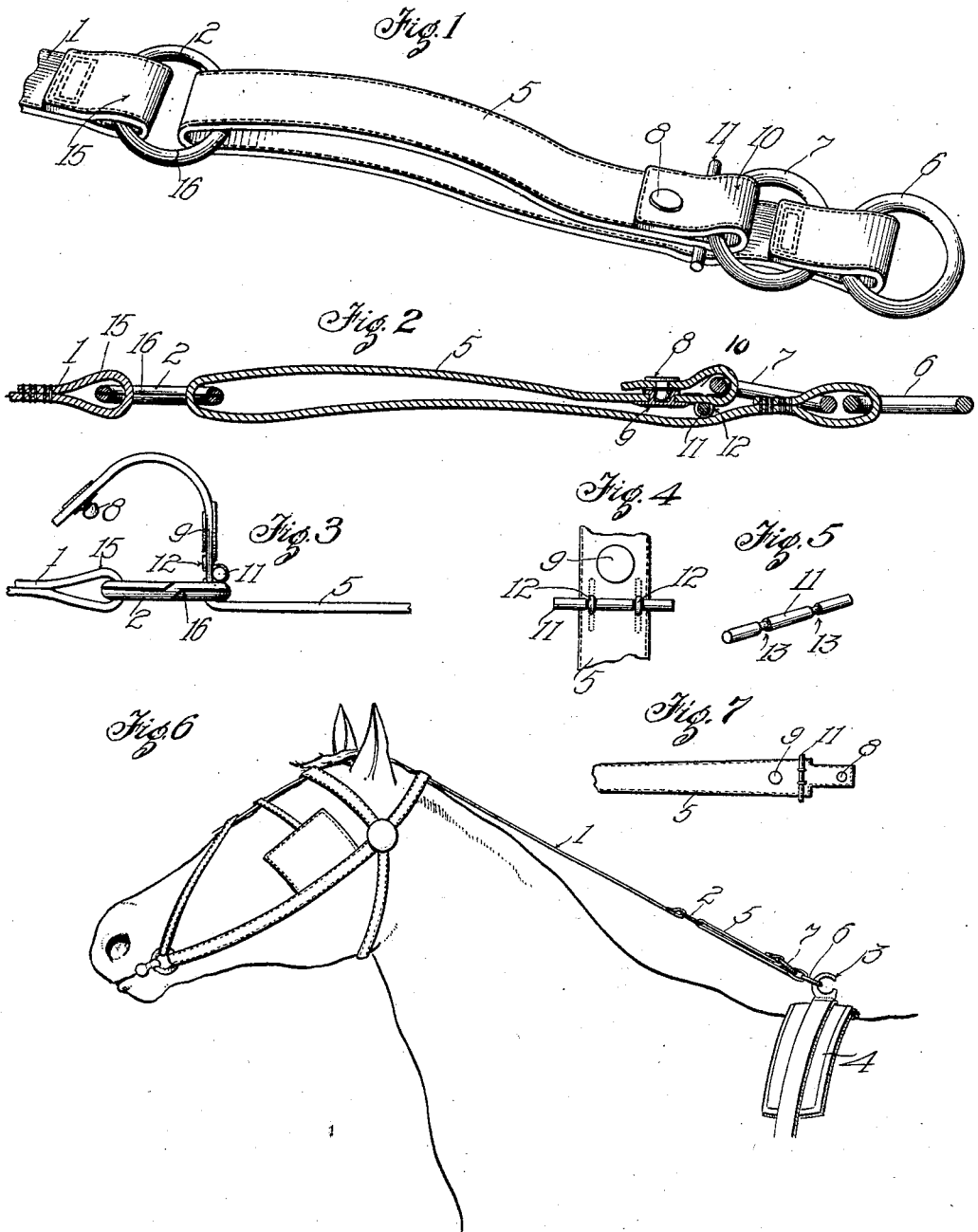

UNITED STATES PATENT OFFICE.

JAMES RODNEY GRIFFITH, OF LOS ANGELES, CALIFORNIA.

CHECKREIN.

SPECIFICATION forming part of Letters Patent No. 773,637, dated November 1, 1904.

Application filed February 25, 1904. Serial No. 195,145. (No model.)

*To all whom it may concern:*

Be it known that I, JAMES RODNEY GRIFFITH, a citizen of the United States, residing at Los Angeles, in the county of Los Angeles and State of California, have invented a new and useful Improvement in Checkreins, of which the following is a specification.

The object of this invention is to provide a checkrein with means whereby it may be quickly and easily lengthened to ease the horse in resting or shortened again to the usual length required for driving.

The accompanying drawings illustrate the invention.

Figure 1 is a perspective of the extensible checkrein-loop embodying my invention. Fig. 2 is a horizontal section thereof. Fig. 3 shows the checkrein-eye with the adjacent loop portion in the open or extended position of the latter. Fig. 4 is a back view of such portion. Fig. 5 is a detail of a retaining-pin thereon. Fig. 6 shows the application of the checkrein to a horse. Fig. 7 is a side view of one form of the free end of the extensible loop.

1 designates the checkrein, having an eye 2 at its rear end, and 3 designates the usual checkrein-hook on the saddle 4. The checkrein is provided with means for temporary extension thereof, said means consisting of a strap 5, provided at one end with an eye or ring 6, adapted to slip over the hook 3, and with another ring or eye 7 to engage the other end of strap 5. Said other end has snap-fastener means formed thereon, consisting of a button 8 and socket 9, which are adapted to engage by a snap or spring action, so as to retain their engagement, said button and socket being sufficiently separated longitudinally of the strap so that when they are in engagement a loop is formed between them, as shown at 10 in Figs. 1 and 2. This same end of the strap 5 is provided with means for engaging the eye 2 on the checkrein to prevent detachment therefrom, said means consisting, for example, of a cross-pin 11, as shown in Figs. 1 and 4, said pin being fastened to the strap by clips 12 engaging in necks 13 in said pin. The strap 5 may, however, be broadened near the end, as shown in Fig. 7, to effect the same purpose, and this broadened portion may have the pin 11 thereon as a reinforcement.

The device will normally be used "checked up"—that is, the strap 5 will be doubled in loop form, its end passed through the eye 7, and then doubled or looped on itself and fastened by snap means 8 9. When it is desired to temporarily loosen the checkrein, the snap-fastener may be pulled open by an instantaneous movement and the strap allowed to draw through the eye 2 until the obstruction 11 strikes said eye and prevents further movement of the strap. The member connecting the checkrein with the saddle is thus extended to about double its usual length, allowing the horse comparative freedom of movement. When it is desired to tighten up the checkrein again, the end of the strap may be quickly pulled back and reëngage with the eye 7 and fastened thereon by the snap means 8 9.

The checkrein extension 5 may be made and sewed as an attachment to an ordinary checkrein, and in that case to enable its ready attachment to such checkrein the attaching or connecting ring or eye 2 is desirably formed so that it can be slipped into engagement with the loop or buckle 15 on the checkrein. For this purpose said ring or eye may be split, as at 16, like an ordinary key-ring, so that it can be threaded through said loop or buckle.

What I claim is—

A checkrein extension comprising a strap having a permanent loop at one end, a button at the other end, a socket near the button, a cross-pin secured to the strap at a point intermediate the button and the socket, two rings in the permanent loop, and a ring on the strap between said rings and the cross-pin.

In testimony whereof I have signed my name to this specification, in the presence of two subscribing witnesses, at Los Angeles, in the county of Los Angeles and State of California, this 15th day of February, 1904.

JAMES RODNEY GRIFFITH.

Witnesses:
ARTHUR P. KNIGHT,
GEORGE T. HACKLEY.